US006705817B2

(12) United States Patent
Wittenstein et al.

(10) Patent No.: US 6,705,817 B2
(45) Date of Patent: Mar. 16, 2004

(54) METHOD AND APPARATUS FOR LOADING AN AIRCRAFT

(75) Inventors: Manfred Wittenstein, Bad Mergentheim (DE); Ken Smith, Boblingen (DE); Hans-Hermann Spohr, Calw (DE)

(73) Assignee: Wittenstein GmbH & Co. KG, Igersheim (DE)

( * ) Notice: Subject to any disclaimer, the term of this patent is extended or adjusted under 35 U.S.C. 154(b) by 64 days.

(21) Appl. No.: 09/999,567

(22) Filed: Oct. 31, 2001

(65) Prior Publication Data

US 2002/0057957 A1 May 16, 2002

(30) Foreign Application Priority Data

Nov. 4, 2000 (DE) ........................................ 100 54 821

(51) Int. Cl.[7] ............................ B64D 9/00; B65G 43/08

(52) U.S. Cl. ....................... 414/373; 414/398; 414/502; 414/809; 244/137.1

(58) Field of Search ................................ 414/373, 390, 414/392, 398, 502, 809; 244/137.1

(56) References Cited

U.S. PATENT DOCUMENTS

| | | | | |
|---|---|---|---|---|
| 4,050,655 A | * | 9/1977 | Bogue et al. | 244/137.1 |
| 4,544,319 A | * | 10/1985 | Folling et al. | 414/505 |
| 4,780,043 A | * | 10/1988 | Fenner et al. | 414/502 |
| 4,949,837 A | * | 8/1990 | Huber | 244/137.1 X |
| 5,749,543 A | * | 5/1998 | Huber | 244/118.1 |

* cited by examiner

*Primary Examiner*—Steven A. Bratlie
(74) *Attorney, Agent, or Firm*—Bachman & LaPointe, P.C.

(57) ABSTRACT

A method for loading an aircraft (R) with shipping containers (3), the latter being passed on conveyor members (13) into the interior of the aircraft (R) and rotated there in a loading area (8), the position of the shipping container (3) in the loading area (8) is determined and the conveyor members (13) are operated via a control system in accordance with the determined position to rotate the shipping container (3).

14 Claims, 2 Drawing Sheets

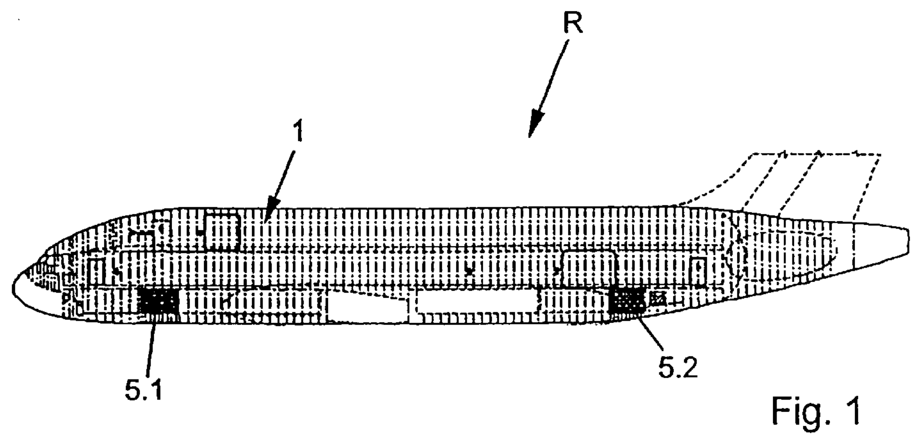
Fig. 1
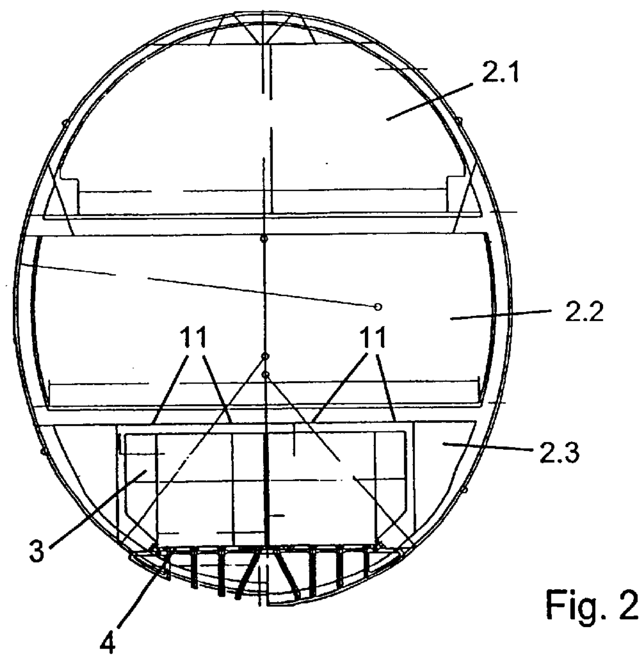
Fig. 2
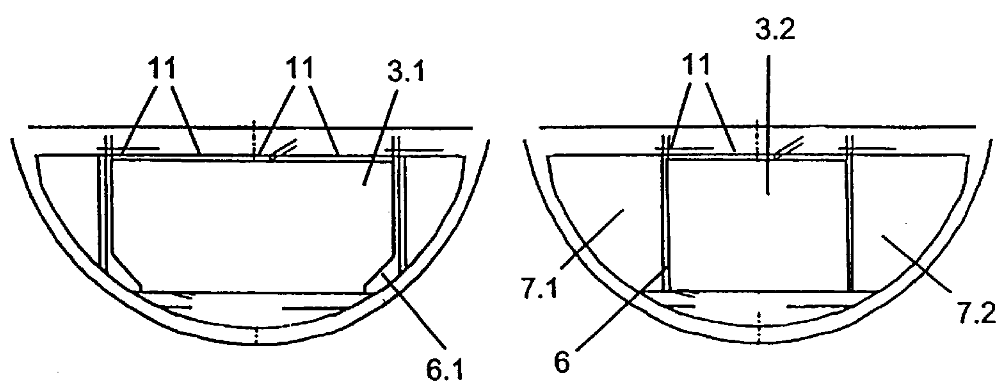
Fig. 3
Fig. 4

METHOD AND APPARATUS FOR LOADING AN AIRCRAFT

BACKGROUND OF THE INVENTION

The invention relates to a method for loading an aircraft with shipping containers, the latter being passed on conveyor members into the interior of the aircraft and rotated there, and to an apparatus therefor.

Aircraft, irrespective of their type, today transport a large number of loads, which are generally contained in shipping containers. These shipping containers have a particular shape which, to an appropriate extent, is adapted to the interior of the aircraft fuselage. The primary aim here is to exploit the available space as thoroughly as possible. One result of this is that the loading areas in which the shipping containers are manipulated are themselves kept as small as possible, so that as much space as possible can be used for the actual storage.

The cargo doors that lead to the loading area are also kept as small as possible, generally having a width that is only slightly greater than the width of the shipping container. This means that the shipping container only fits through the cargo door narrow side first, but then has to be rotated through approximately 90° in order to be able to be moved further on in the lengthwise direction of the aircraft.

The introduction, rotation and onward conveyance of the shipping containers still takes place manually today, which requires a substantial effort of manpower. Moreover, it is very difficult to rotate the shipping container in the loading area without repeatedly standing it on a corner.

It is an object of the present invention to develop a method and an apparatus of the abovementioned type by means of which the loading of an aircraft becomes possible fully automatically and without damage to shipping containers and/or the loading area.

SUMMARY OF THE INVENTION

The foregiong object is achieved in that the position of the shipping container in the loading area is determined and the conveyor members are operated via a control system in accordance with the determined position to rotate the shipping container.

This means that the loading of an aircraft with shipping containers can take place automatically, as continuous comparisons take place between the sensor values and the conveyor members. The sensor members also do not permit the shipping container to be stood on a corner in the interior of the aircraft, so that risks to other components within the aircraft are ruled out.

The rotation of the shipping container takes place fully automatically, and its position is determined without contact.

The shipping container is introduced into the loading area until it has reached a predetermined distance from an end reference point, for example an end wall. The sensor determines this distance. Thereafter, laterally oriented conveyor members are set in operation and rotate the shipping container a little further. At the same time, or subsequently, conveyor members can in turn move the shipping container somewhat deeper into the loading area, in other words, for example, convey it toward an end wall, before the laterally oriented conveyor members again rotate the shipping container a little further. Sensors are provided here in order likewise to determine the lateral distance of the shipping container.

It is self-explanatory here that at least the laterally oriented conveyor members can rotate at different speeds, depending on how far removed they are from a point of rotation for the shipping container. The conveyor members close to the end wall of the shipping container which is in the loading area should be operated at the highest speed.

In this manner, it is possible to rotate the shipping container into a desired position in which it can be further conveyed in the lengthwise direction of the aircraft.

A corresponding apparatus for performing the method has sensors for determining the position of the container. These sensors may be disposed either on the shipping container itself or in the loading area, for example on corresponding end or side walls or end or side struts.

The sensors are preferably proximity sensors and may operate by means of ultrasound, radar or the like. Ultrasonic sensors have the advantage, for example, of being completely unaffected by weather.

The height at which the sensors are disposed depends on the shape of the shipping container.

The work of rotation is done by the conveyor members, at least parts of these conveyor members being provided with a drive. Preferably, the conveyor members are the conventional PDUs (power drive units). The PDUs are active drive devices which may optionally also be disposed between passive roller conveyors so as to be capable of continuous twisting in order to convey the shipping container continuously into the interior space. The latter lie between passive roller conveyors in which consecutive conveyors are disposed perpendicularly to one another. This means that roller conveyors for transporting the shipping container in the direction of entry into the loading area extend parallel to that direction of entry, while roller conveyors for the perpendicular transfer of the shipping container extend in the direction of entry. Ball mat areas may also be provided, especially in the opening area, in which the shipping container is rotated or introduced into the cargo space.

The matching of the conveyor members to the sensors is important, and takes place by means of a control system which controls the respective conveyor members to be brought into operation as a function of the shipping container position determined by the sensors. An appropriate number of sensors makes it possible to record the position of the container continuously during the loading and rotation operations and then to start and regulate the loading mechanism accordingly. The whole procedure takes place fully automatically and, as the sensors preferably operate without contact, without the risk of damage.

BRIEF DESCRIPTION OF THE DRAWINGS

Further advantages, features and details of the invention are apparent from the description of preferred examples of embodiment that follows and with reference to the drawing; in which:

FIG. 1 shows a diagrammatically presented lateral view of an aircraft;

FIG. 2 shows a cross section through the aircraft shown in FIG. 1;

FIGS. 3 and 4 show partial cross sections through the aircraft shown in FIG. 1, loaded with different shipping containers;

DETAILED DESCRIPTION OF THE DRAWINGS

Figure 5:
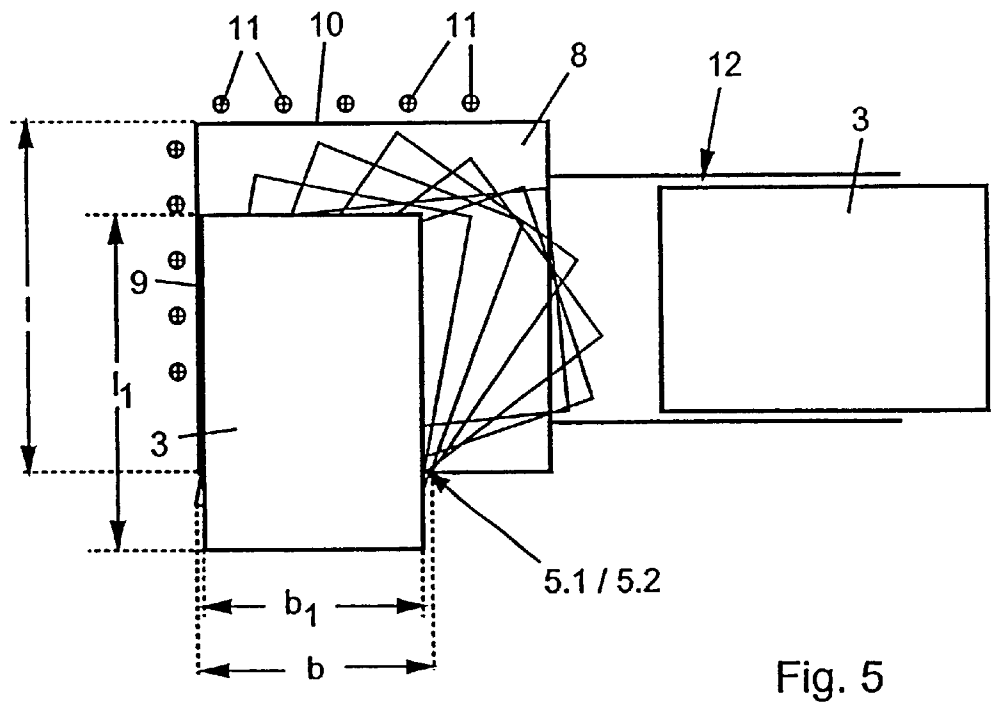
FIG. 5 shows a diagrammatically presented plan view of a loading area of the aircraft.

An aircraft R has, according to FIG. 1, a fuselage 1 which, according to FIG. 2, is subdivided into three planes 2.1, 2.2 and 2.3 in the example of embodiment shown. The plane 2.3 is intended for loading with shipping containers 3, these shipping containers 3 being able to be moved on corresponding roller conveyors 4 in the lengthwise direction of the aircraft R.

The loading of the aircraft R takes place via two cargo doors 5.1 and 5.2.

In FIGS. 3 and 4, two different shapes of shipping containers 3.1 and 3.2 are indicated, these being disposed in accordance with the space available within the aircraft. For example, the loading space 6 to be occupied by shipping container 3.2 is, according to FIG. 4, smaller than the loading space 6.1 shown in FIG. 3. The reason for this is that free spaces 7.1 and 7.2 adjacent to the space 6 can be used, for example, to accommodate driving gear or the like.

According to FIG. 5, a cargo door 5.1/5.2 is followed by a loading area 8, indicated diagrammatically. In this case, a width b of the cargo door 5.1/5.2 is only slightly greater than a width $b_1$ of the shipping container 3. An entry length L of the loading area 8 is also only slightly greater than a length $l_1$ of the shipping container 3.

Sensors 11 are indicated on a side wall 9 and an end wall 10 of the loading area 8. Laterally, an elongate cargo space 12 adjoins the loading area 8. The sensors 11 may also be disposed in the ceiling of the cargo space 12, for example in a grid pattern, in order to identify the movement and position of the shipping container 3 and move it actively by means of the PDUs, as is indicated in FIGS. 2 to 4. In this case, it is also intended to be included within the scope of the present invention that the sensors 11 are to be disposed or provided on the side wall 9, end wall 10 and/or ceiling of the cargo space 12 over the entire cargo space 12.

Figure 6:
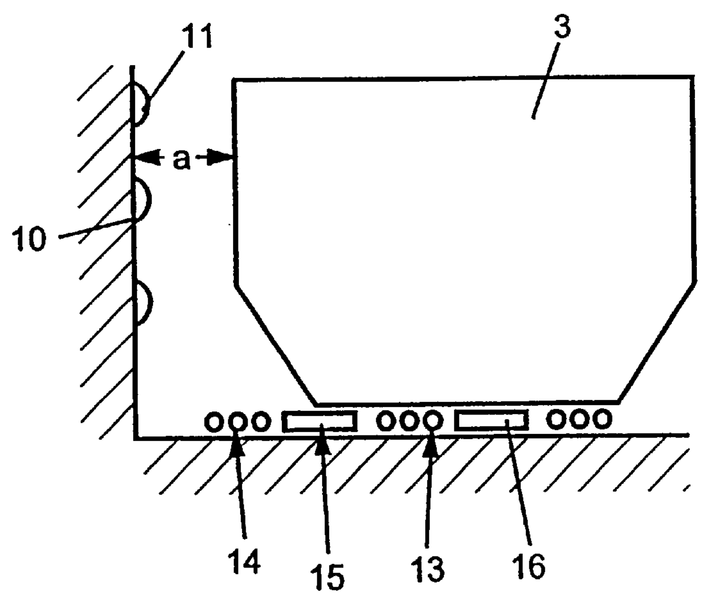
FIG. 6 shows a diagrammatically presented lateral view of the loading area.

In accordance with FIG. 6, conveyor members 13 are located underneath the shipping container 3. These, in the example of embodiment shown, may consist of roller conveyors 14 and 15 which are in each case disposed perpendicularly to one another, individual rollers 16 being driven both by roller conveyor 14 and by roller conveyor 15.

The manner of operation of the present invention is as follows:

Since the width b of the cargo door 5.1/5.2 is only slightly greater than the width $b_1$ of the shipping container 3, the latter can only pass through the cargo door 5.1/5.2 into the loading area 8 narrow side first. As, moreover, the elongate cargo space 12 through which the shipping container 3 has to be conveyed is disposed approximately perpendicularly to the entry position of the shipping container 3 into the loading area 8, the shipping container 3 must be rotated through approximately 90° in the loading area 8. For this purpose, the sensors 11 determine the position of the shipping container 3 and, via an appropriate control system, start the conveyor members 13 in such a way that the shipping container 3 is rotated in a plurality of movements which are shown in broken lines in FIG. 5.

This means that the shipping container 3 passes through the cargo door 5.1/5.2 into the loading area 8. One or more of the sensors 11 on the end wall 10 determine a distance between the shipping container 3 and this end wall 10. The conveyance of the shipping container 3 is taken over by the roller conveyors 14, which are disposed parallel to the entrance direction of the shipping container 3.

When the sensors 11 determine a specific distance a of the shipping container 3 from the end wall 10, the roller conveyors 15 are set in operation and their rollers extend in the entrance direction of the shipping container 3. This applies especially to the roller conveyors 15, which are disposed close to the end wall 10. In this manner, the front part of the shipping container 3 rotates toward the cargo space 12, the roller conveyors 14 being stopped or slowed. They are then set in operation again when sensors 11 on the side wall 9 ascertain a particular distance between the shipping container 3 and the side wall 9. As a result, the shipping container moves on a little further into the loading area 8, so that its front area, after the sensors 11 have ascertained a predetermined distance on the end surface 10, can be rotated onward again. This takes place until the shipping container 3 is in a position such that it can run into the elongate cargo space 12.

What is claimed is:

1. In a cargo carrying aircraft having sidewalls and a floor for carrying cargo containers wherein a side loading cargo doorway leads to a loading area and the floor in the loading area includes conveyor means for rotating a cargo container in the loading area and transporting the rotated cargo container to a cargo space in the aircraft, a method for loading the aircraft without touching the sidewall of the aircraft comprises the steps of:

(a) providing a plurality of sensors on at least one of (1) the loading area of the aircraft and (2) the cargo container;

(b) introducing a cargo container into the loading area;

(c) continually sensing a current position of the cargo container in the loading area;

(d) activating the conveyor means in response to the current sensed position of the cargo container in the loading zone to provide for step wise rotation of the cargo container in the loading zone until the container is aligned with the cargo space; and (e) transported the rotated cargo container into the cargo space.

2. The method as claimed in claim 1, including (f) introducing cargo container into the loading area, (g) sensing when the cargo container reaches a predetermined distance (a) from an end reference point, (h) rotating the cargo container until it arrives at a particular distance from a lateral reference point, and (i) repeating (f) through (i) until such time as the cargo container has reached its aligned end position.

3. The method as claimed in claim 1, including disposing at least some of the plurality of sensors for determining the position of the container on the sidewall of the loading area.

4. The method as claimed in claim 3, wherein the sensors are proximity sensors.

5. The method as claimed in claim 3, wherein the sensors operate without contact by means of at least one of (1) ultrasound and (2) radar.

6. The method as claimed in claim 3, wherein the conveyor means is provided with a drive.

7. The method as claimed in claim 6, wherein the conveyor means comprises at least a plurality of PDUs (power drive units) wherein the PDUs are activated and the remaining conveyor members are passively driven.

8. The method as claimed in claim 7, wherein the PDUs are actively driven and are continuously rotatable and drivable relative to the conveying direction of the cargo container.

9. The method as claimed in claim 6, wherein the conveyor means comprises roller conveyors disposed perpendicularly relative to one another.

10. The method as claimed in claim 9, wherein at least individual rollers of the roller conveyors are activated.

11. The method as claimed in claim 3, including connecting the conveyor means and the sensors to a control system for adjusting the actuating of the conveyor means as a function of the position of the cargo container as determined by the sensors.

12. The method as claimed in claim 3, wherein the conveyor means is at least partially in the form of ball mat areas.

13. The method as claimed in claim 6, wherein the conveyor means is formed as ball mat areas and is provided in the loading area and PDUs lying between them are rotatably disposed.

14. The method as claimed in claim 1, wherein the sensors are disposed on at least one of the side walls, end walls, and ceiling of the cargo container.

* * * * *